(12) United States Patent
Kawamura et al.

(10) Patent No.: US 11,249,316 B2
(45) Date of Patent: Feb. 15, 2022

(54) VEHICLE DISPLAY DEVICE

(71) Applicant: Yazaki Corporation, Tokyo (JP)

(72) Inventors: Atsushi Kawamura, Shizuoka (JP); Tetsuya Sugiyama, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 76 days.

(21) Appl. No.: 16/809,605

(22) Filed: Mar. 5, 2020

(65) Prior Publication Data

US 2020/0285063 A1 Sep. 10, 2020

(30) Foreign Application Priority Data

Mar. 6, 2019 (JP) .............................. JP2019-040545

(51) Int. Cl.
*G02B 27/01* (2006.01)
*B60K 35/00* (2006.01)

(52) U.S. Cl.
CPC .......... *G02B 27/0179* (2013.01); *B60K 35/00* (2013.01); *G02B 27/0101* (2013.01); *B60K 2370/1529* (2019.05); *B60K 2370/18* (2019.05); *B60K 2370/23* (2019.05); *B60K 2370/334* (2019.05); *B60K 2370/785* (2019.05); *G02B 2027/0181* (2013.01)

(58) Field of Classification Search
CPC ........ G02B 27/0179; G02B 2027/0187; G02B 27/0101; G02B 2027/0154; B60K 2370/1529
See application file for complete search history.

(56) References Cited

U.S. PATENT DOCUMENTS

| 2009/0140845 | A1 | 6/2009 | Hioki |
| 2018/0031834 | A1 | 2/2018 | Yamamura |
| 2018/0210210 | A1* | 7/2018 | Yamamura ......... G02B 27/0101 |

FOREIGN PATENT DOCUMENTS

| JP | 9-265054 A | 10/1997 |
| JP | 2003-39983 A | 2/2003 |
| JP | 2014-136520 A | 7/2014 |
| JP | 2017-149182 A | 8/2017 |
| WO | 2018/043513 A1 | 3/2018 |

* cited by examiner

*Primary Examiner* — Ryan D Howard
(74) *Attorney, Agent, or Firm* — Kenealy Vaidya LLP

(57) ABSTRACT

A vehicle display device includes a housing to be mounted on a vehicle and having an opening, a display unit disposed inside the housing and configured to project a display image toward a reflection unit arranged in front of a driver seat through the opening, and a controller configured to cause the display unit to exhibit a range display that defines a maximum range for a display image, upon detection of information indicating a change in the viewpoint of a driver on the vehicle.

14 Claims, 4 Drawing Sheets

VEHICLE DISPLAY DEVICE

CROSS-REFERENCE TO RELATED APPLICATION(S)

The present application claims priority to and incorporates by reference the entire contents of Japanese Patent Application No. 2019-040545 filed in Japan on Mar. 6, 2019.

BACKGROUND OF THE INVENTION

1. Field of the Invention

The present invention relates to a vehicle display device.

2. Description of the Related Art

Various display devices for a vehicle such as a head-up display are used. Japanese Patent Application Laid-open No. 9-265054 describes a technique relating to a head-up type display device for a vehicle that includes display means to display a part of the contour of a body of another vehicle in front of the vehicle or of an object installed to the body of the vehicle, and display location changing means to move the display location of the part of the contour to a location overlapping with a corresponding contour of the actual vehicle in response to an instruction of the driver.

The head-up type display device for vehicle of Japanese Patent Application Laid-open No. 9-265054 is advantageous in maintaining the effect of display even when the eye level of the driver is changed.

In use of a vehicle display device, however, such a technique is desired that allows a driver to easily determine whether the display location of a display image is suitable.

SUMMARY OF THE INVENTION

It is therefore an object of the present invention to provide a vehicle display device that allows a driver to easily determine whether the display location of a display image is suitable.

In order to achieve the above mentioned object, a vehicle display device according to one aspect of the present invention includes a housing mounted on a vehicle and having an opening; a display unit disposed inside the housing and configured to project a display image toward a reflection unit arranged in front of a driver seat through the opening; and a controller configured to cause the display unit to exhibit a range display that defines a maximum range for the display image, upon detection of information indicating a change in a viewpoint of a driver on the vehicle.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

A vehicle display device of an embodiment of the present invention will now be described with reference to accompanying drawings. The embodiment is not intended to limit the present invention. Components described below in the embodiment include what can be easily conceived of by the skilled person and what are substantially the same.

Embodiment

Figure 1:
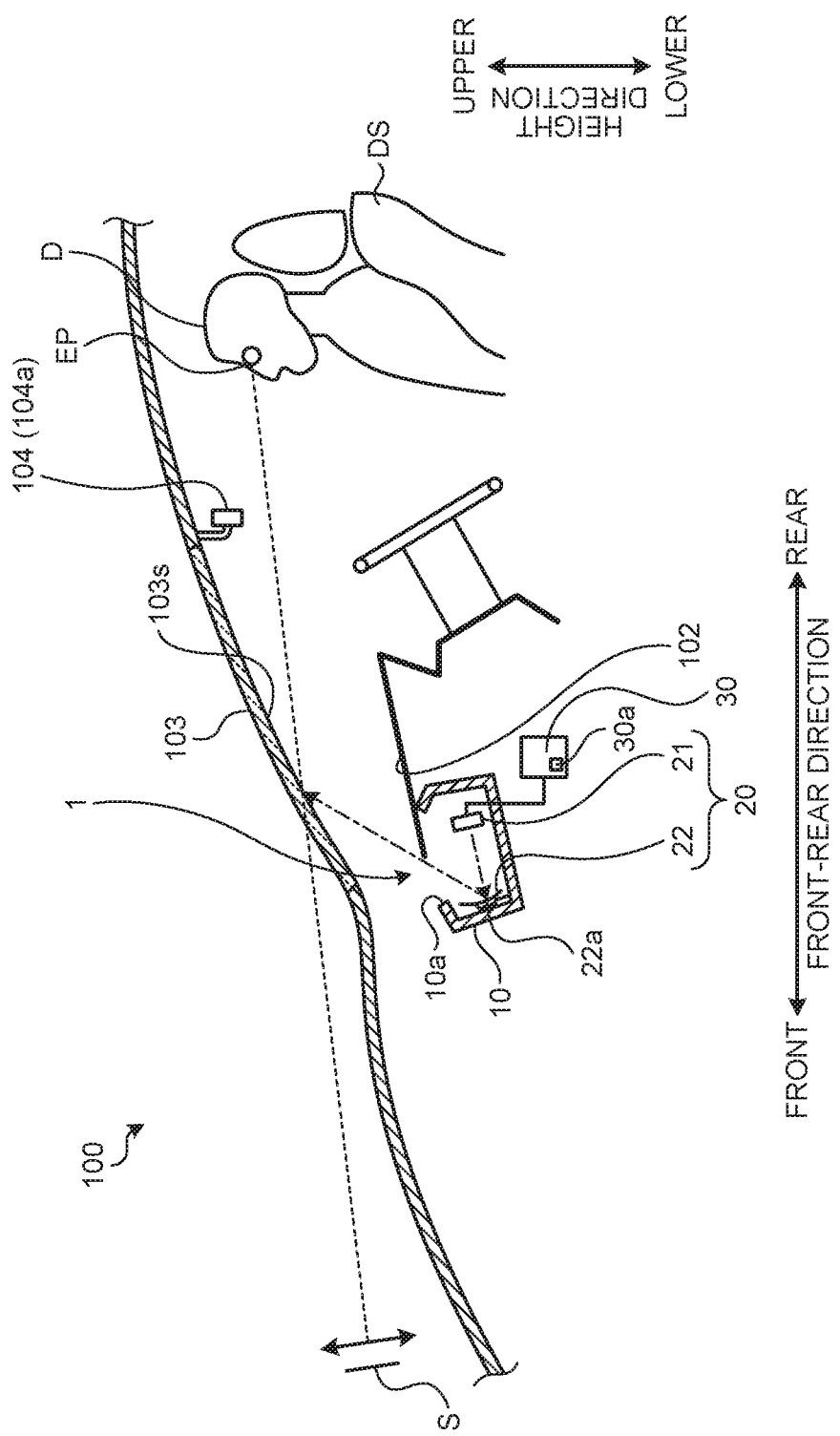
FIG. 1 is a schematic diagram that illustrates a vehicle display device according to an embodiment.
Figure 2:
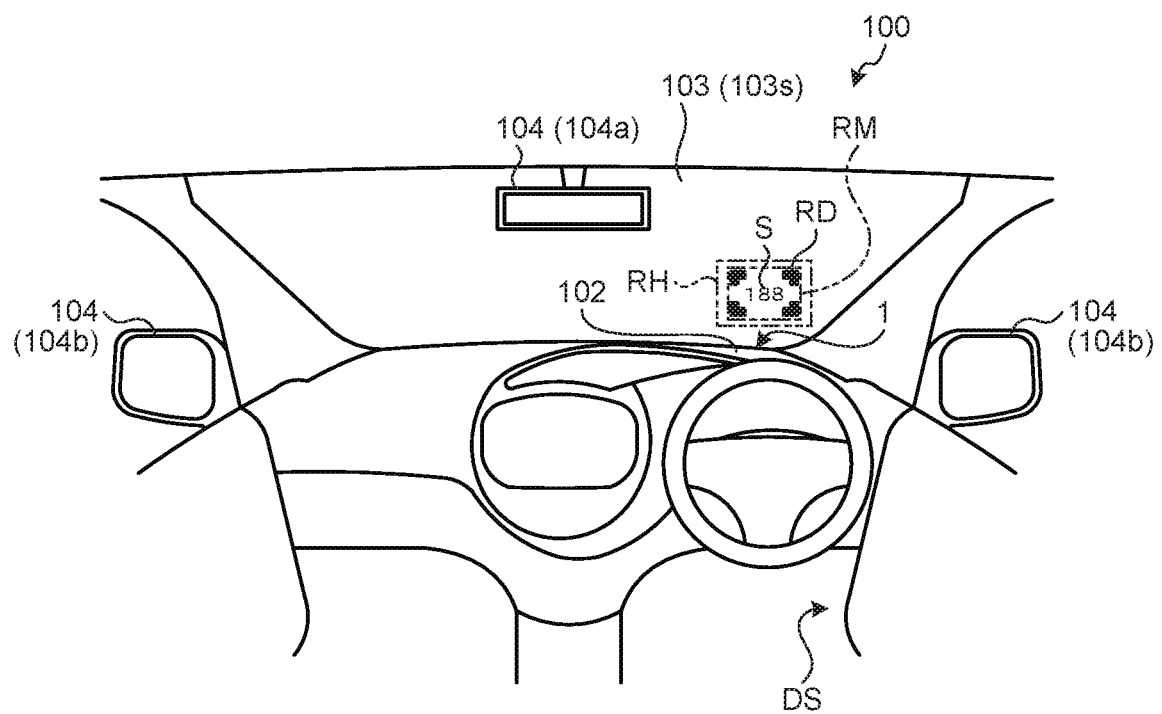
FIG. 2 is a drawing that illustrates a display image viewed from the cabin.
Figure 3:
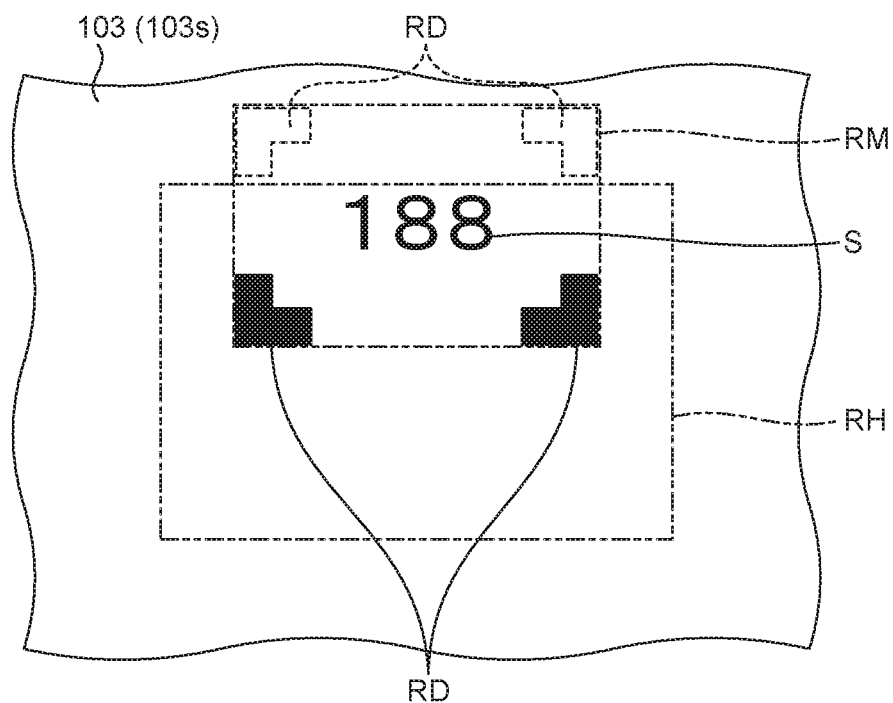
FIG. 3 is a plan view of the display image of the embodiment.
Figure 4:
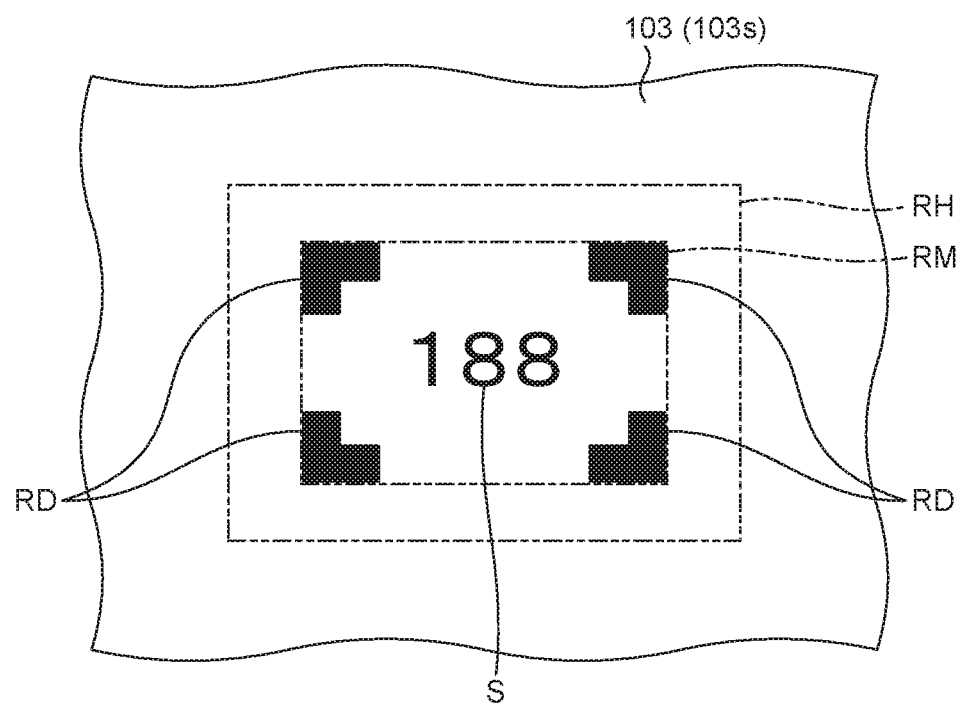
FIG. 4 is another plan view of the display image of the embodiment.

An embodiment will now be described with reference to FIGS. 1 to 4. The embodiment relates to a vehicle display device. FIG. 1 is a schematic diagram that illustrates the vehicle display device according to the embodiment. FIG. 2 is a drawing that illustrates a display image viewed from the cabin. FIG. 3 is a plan view of the display image of the embodiment. FIG. 4 is another plan view of the display image of the embodiment.

In the description, the "front-rear direction" of FIG. 1 indicates the front-rear direction of a vehicle 100 in which a vehicle display device 1 is installed. Likewise, the "height direction" indicates the height direction of the vehicle 100 in which the vehicle display device 1 is installed. The "width direction" indicates the vehicle width direction of the vehicle 100 in which the vehicle display device 1 is installed.

As illustrated in FIG. 1, the vehicle display device 1 of the embodiment is installed in the vehicle 100 such as an automobile. The vehicle display device 1 of the embodiment is a head-up display. The vehicle display device 1 is installed inside a dashboard 102 of the vehicle 100. The vehicle display device 1 emits a display image S in the form of imaging illumination onto a reflection surface 103s of a reflection unit 103 of the vehicle 100.

In the embodiment, the reflection unit 103 is a windshield. The reflection unit 103 of the embodiment is disposed in front of a driver D on the vehicle. The reflection surface 103s of the reflection unit 103 may be coated with semi-transmissive coating that reflects a part of incident light and allows other part of the light to pass through. The imaging illumination emitted to the reflection surface 103s is reflected on the reflection surface 103s into a viewpoint EP of the driver D on the vehicle 100, which allows the driver D to view the display image S as a virtual image.

The vehicle display device 1 of the embodiment includes a housing 10, a display unit 20, and a controller 30.

The housing 10 is, for example, a box-shaped member formed of synthetic resin and other materials. The housing 10 has an opening 10a through which an accommodation space surrounded by the housing 10 and the outside of the housing 10 communicate with each other. The vehicle display device 1 of the embodiment projects the display image S onto the reflection unit 103 through the opening 10a.

The display unit 20 is disposed in the housing 10 (in the accommodation space of the housing 10). The display unit 20 includes a picture generation unit 21 and a reflection member 22. The picture generation unit 21 of the embodiment includes a light source and a liquid crystal display. The picture generation unit 21 allows light of the light source to pass through and emits the light as imaging illumination. Examples of the light source include a light emitting diode (LED). The light source is turned on by receiving electric power from a power source mounted on the vehicle 100. The liquid crystal display may be, for example, a light-transmissive thin film transistor (TFT) liquid crystal display.

The picture generation unit 21 emits the display image S representing, for example, information of the vehicle, as imaging illumination. Example of the vehicle information include, the travel speed of the vehicle, the number of revolutions output by a drive power source, the mileage, the temperature of coolant, the fuel level, the amount of charge in the battery, various warning lights, the gear position, a direction indicated by the indicator, information of the navigation system, and various signs and figures to be overlapped on the scene viewed over the windshield (the reflection unit 103) from the viewpoint EP.

The reflection member 22 reflects the imaging illumination toward the reflection surface 103s of the reflection unit 103. The imaging illumination emitted from the picture generation unit 21 is reflected on the reflection member 22 in the accommodation space of the housing 10 and reaches the reflection surface 103s of the reflection unit 103 passing through the opening 10a. The imaging illumination that reaches the reflection surface 103s is at least partially reflected on the reflecting surface 103s toward the viewpoint EP of the driver D. The reflection member 22 of the embodiment is a magnifying mirror where the imaging illumination emitted from the liquid crystal display is magnified and reflected. The reflection member 22 may use, for example, an aspherical (free curved surface) mirror. The vehicle display device 1 having the above configuration projects the display image S representing vehicle information on the reflection unit 103. In the embodiment, the vehicle display device 1 displays a set of numbers "188" as an example of the display image S.

The controller 30 is a control unit to control the display unit 20 and is electrically connected with the picture generation unit 21. The controller 30 of the embodiment is disposed outside the housing 10. The controller 30 may be accommodated in the accommodation space of the housing 10.

The vehicle display device 1 of the embodiment includes a drive unit 22a that changes the inclination angle of the reflection member 22 with respect to the picture generation unit 21. The reflection member 22 is fixed to the housing 10 through the drive unit 22a. The imaging illumination reaches a position, on the reflection surface 103s, corresponding to the inclination angle of the reflection member 22 to the picture generation unit 21. The imaging illumination is allowed to reach different positions on the reflection surface 103s by changing the inclination angle of the reflection member 22 to the picture generation unit 21 using the drive unit 22a. In other words, the display location (the location where the display image S is projected, on the reflection unit 103) of the display image S can be changed by changing the inclination angle of the reflection member 22.

The display image S projected on the reflection unit 103 sometimes cannot be suitably viewed by the driver D, depending on the relation between the viewpoint EP of the driver D and the display location of the display image S. For example, if the viewpoint EP of the driver D is located higher than the range of viewpoints in which the display image S projected on the reflection unit 103 is suitably viewable, the display image S projected on the upper portion of a maximum range RM is not viewable (see FIG. 3). This phenomenon is caused because the imaging illumination corresponding to the upper portion of the maximum range RM is reflected by the reflection member 22 into areas outside the edge of the opening 10a and reaches the inner surface of the housing 10. The imaging illumination corresponding to the upper portion of the maximum range RM is blocked by the housing 10 and prevented from reaching the viewpoint EP of the driver D.

In this case, for example, the drive unit 22a can adjust the path of the imaging illumination such that the imaging illumination can pass through the opening 10a, enter the reflection unit 103, and suitably reach the viewpoint EP of the driver D. The picture generation unit 21, however, does not always display the display image S throughout the maximum range RM, and the driver D therefore may fail to notice that a part of the display image S is unviewable. For example, such as the display location of FIG. 3, if the display image S is included only in the lower portion of the maximum range RM, the driver D is less likely to notice that the display image S in the upper portion of the maximum range RM is unviewable. In other words, the driver D has difficulty in determining whether the display location of the display image S is suitable. In the description, "the display location of the display image S is suitable" means that the display location of the display image S is at a location allowing the display image S to be viewable throughout the maximum range RM from the viewpoint EP.

In the embodiment, the controller 30 causes the display unit 20 to exhibit a range display RD that defines the maximum range RM for the display image S. More specifically, the controller 30 causes the display unit 20 to exhibit the range display RD that defines the maximum range RM for the display image S, when the controller 30 detects information relating to a change in the viewpoint EP of the driver D on the vehicle 100.

In the embodiment, the information indicating a change in the viewpoint EP of the driver D on the vehicle 100 is a change in the seat position of a driver seat DS. The controller 30 of the embodiment acquires the seat position of the driver seat DS. For example, the controller 30 detects a change in the seat position of the driver seat DS when the driver D changes the seat position of the driver seat DS. As illustrated in FIG. 2, the display image S is projected on the reflection unit 103 in front of the driver seat DS, by the vehicle display device 1. Upon detection of a change in the seat position of the driver seat DS, the controller 30 causes the display unit 20 to exhibit the range display RD that defines the maximum range RM for the display image S.

In the embodiment, the maximum range RM for the display image S is the image displayable range of the liquid crystal display of the picture generation unit 21. The controller 30 causes the display unit 20 to exhibit the range display RD so that the driver D can recognize the maximum range RM for the display image S. The range display RD is displayed as a frame along the edge of the maximum range RM. In the embodiment, the range display RD forms a frame in the form of corner bracket. Each bracket is arranged at a corresponding corner of the maximum range RM to put the maximum range RM in the frame of the range display RD. In other words, the range display RD as four L-shaped blocks is arranged along the respective corners of the maximum range RM and forms a frame that surrounds the maximum range RM. The range display RD may be a rectangular frame along the edge of the maximum range RM. The shape of the frame of the range display RD may correspond to the shape of the opening 10a. If the opening 10a is circular, for example, the range display RD may be a circular frame.

For example, when the driver D changes the seat position of the driver seat DS, the viewpoint EP of the driver D may be located higher than the range of the suitable location in which the display image S projected on the reflection unit 103 is properly viewable. In this case, since the imaging illumination of the display image S reflected by the reflection member 22 toward the viewpoint EP does not fit within an opening range RH of the opening 10a, as illustrated in FIG. 3, the upper portion (two corner brackets on the top among four arranged corner brackets) of the range display RD is unviewable from the viewpoint EP of the driver D. With the range display RD, the driver D is allowed to visually determine whether the display image S at the current display location is suitably viewable throughout the maximum range RM.

When the driver D makes an input to the vehicle display device 1 of changing the display location of the display image S, the controller 30 detects the input as the information indicating a change in the viewpoint of the driver D. The driver D is therefore allowed to change the display location of the display image S in the state of displaying the range display RD. By changing the display location of the display image S to a location where the range display RD is entirely viewable, with the range display RD, the driver D is allowed to easily adjust the display location of the display image S to a suitable location in comparison with a display device without the range display RD. In other words, the driver D is allowed to control the imaging illumination reflected by the reflection member 22 so that the imaging illumination fits within the opening range RH of the opening 10a. By adjusting the display location of the display image S with reference to the range display RD, the driver D is allowed to easily fit the maximum range RM for the display image S within the opening range RH as illustrated in FIG. 4. With the maximum range RM fit in the opening range RH, the display image S is viewable from the driver D throughout the maximum range RM.

As illustrated in FIG. 2, the vehicle 100 is provided with a mirror unit 104 that reflects the view behind the vehicle. The mirror unit 104 includes a rear-view mirror 104a and side-view mirrors 104b. The rear-view mirror 104a is disposed on the upper end of a windshield (the reflection unit 103), particularly, in the center thereof in the width direction of the vehicle 100. As illustrated in FIG. 1, the rear-view mirror 104a is located above and in front of the driver D. As illustrated in FIG. 2, two side-view mirrors 104b are provided to the vehicle 100. Each side-view mirror 104b is mounted on a corresponding front door of the vehicle 100. Two side-view mirrors 104b are positioned to be viewable from the driver D facing forward.

The controller 30 of the embodiment may detect a change in the inclination angle of the mirror unit 104 as the information indicating a change in the viewpoint EP. For example, when the driver D changes the inclination angle of the mirror unit 104, the controller 30 detects the change in the inclination angle of the mirror unit 104 and causes the display unit 20 to exhibit the range display RD that defines the maximum range RM for the display image S. With the range display RD, for example, the driver D is allowed to adjust the mirror unit 104 to his or her viewpoint EP, while checking whether the display location of the display image S by the vehicle display device 1 is suitably viewable from the viewpoint EP.

The viewpoint EP may vary depending on the sitting height of the driver D on board of the vehicle 100. For example, if there is a difference in the sitting height between the driver D and a previous driver who was on the vehicle 100 before the driver D, the driver D may change the settings such as the seat position of the driver seat DS and the inclination angle of the mirror unit 104 before turning on the vehicle display device 1.

The controller 30 of the embodiment includes a storage unit 30a (see FIG. 1) that stores at least one of the seat position of the driver seat DS or the inclination angle of the mirror unit 104. In the case of storing the seat position of the driver seat DS in the storage unit 30a, when the vehicle display device 1 is powered off, the controller 30 controls the storage unit 30a to store the seat position of the driver seat DS at the time of powering off. When the vehicle display device 1 is powered on afterward, the controller 30 acquires the seat position of the driver seat DS at the time of powering on. The controller 30 compares the acquired seat position of the driver seat DS with the position stored in the storage unit 30a. If the seat position of the driver seat DS acquired by the controller 30 when the vehicle display device 1 is powered on is different from the seat position of the driver seat DS stored in the storage unit 30a, the controller 30 detects this information as the information indicating a change in the viewpoint EP. The controller 30 then controls the display unit 20 to exhibit the range display RD that defines the maximum range RM for the display image S.

In the case of storing the inclination angle of the mirror unit 104 in the storage unit 30a, when the vehicle display device 1 is powered off, the controller 30 controls the storage unit 30a to store the inclination angle of the mirror unit 104 at the time of powering off. When the vehicle display device 1 is powered on afterward, the controller 30 acquires the inclination angle of the mirror unit 104 at the time of powering on. The controller 30 compares the acquired inclination angle of the mirror unit 104 with the inclination angle stored in the storage unit 30a. If the inclination angle of the mirror unit 104 acquired by the controller 30 when the vehicle display device 1 is powered on is different from the inclination angle of the mirror unit 104 stored in the storage unit 30a, the controller 30 detects this information as the information indicating a change in the viewpoint EP. The controller 30 then controls the display unit 20 to exhibit the range display RD that defines the maximum range RM for the display image S.

The controller 30 of the embodiment may also detect an input to adjust the seat position of the driver seat DS as the information indicating a change in the viewpoint of the driver D. For example, the controller 30 may detect an input of the driver D of pressing a seat position adjust button attached to the driver seat DS, as the information indicating a change in the viewpoint of the driver D. The controller 30 then controls the display unit 20 to exhibit the range display RD that defines the maximum range RM for the display image S.

The controller 30 acquires the information indicating a change in the viewpoint EP via, for example, wired communication via a routing member and wireless communication.

The controller 30 may acquire the viewpoint EP of the driver D from an imaging unit provided in the vehicle 100. The imaging unit may be installed to the roof of the vehicle 100 and located in front of the driver seat DS. Examples of the imaging unit may include a digital camera having an imaging device such as a charge-coupled device (CCD)

image sensor and a complementary metal oxide semiconductor (CMOS) image sensor. The imaging device photoelectrically converts a captured image into imaging information. The imaging information is wiredly or wirelessly transmitted to the controller 30.

The storage unit 30a stores the viewpoint EP of the driver D, acquired by the controller 30 from the imaging unit, when the vehicle display device 1 is powered off. When the vehicle display device 1 is powered on, the controller 30 acquires the viewpoint EP of the driver D on the vehicle 100 from the imaging unit. If the viewpoint EP of the driver D acquired by the controller 30 when the vehicle display device 1 is powered on is different from the viewpoint of the driver D stored in the storage unit 30a, the controller 30 detects this information as the information indicating a change in the viewpoint EP. The controller 30 then controls the display unit 20 to exhibit the range display RD that defines the maximum range RM for the display image S.

As described above, the vehicle display device 1 of the embodiment includes the housing 10 to be mounted on the vehicle 100 and having the opening 10a, the display unit 20 disposed inside the housing 10 and configured to project the display image S toward the reflection unit 103 in front of the driver seat DS through the opening 10a, and the controller 30 configured to cause the display unit 20 to exhibit the range display RD that defines the maximum range RM for the display image S upon detection of information indicating a change in the viewpoint EP of the driver D on the vehicle 100.

In the vehicle display device 1, since the display image S is not always displayed throughout the maximum range RM, the driver D may have difficulty in determining whether a part of the maximum range RM having no display images S is viewable from his or her viewpoint EP. In the vehicle display device 1 of the embodiment, upon detection of information indicating a change in the viewpoint EP of the driver D on the vehicle 100, the controller 30 causes the display unit 20 to exhibit the range display RD that defines the maximum range RM for the display image S. With the range display RD, the driver D is allowed to easily determine whether the display location of the display image S is suitable.

The vehicle display device 1 of the embodiment uses the range display RD in the form of frame along the edge of the maximum range RM. With the range display RD formed in frame along the edge of the maximum range RM, the driver D is allowed to determine whether the top, the bottom, the right, and the left of the display location of the display image S are suitable.

Furthermore, in the vehicle display device 1 of the embodiment, the information indicating a change in the viewpoint EP is a change in the seat position of the driver seat DS. For example, the viewpoint EP of the driver D varies when the driver D changes the seat position of the driver seat DS. By the controller 30 detecting such a change in the seat position of the driver seat DS as the information indicating a change in the viewpoint EP, and causing the display unit 20 to exhibit the range display RD, the range display RD allows the driver D to easily determine whether the display location of the display image S is suitable for the new viewpoint EP.

In the vehicle display device 1 of the embodiment, the information indicating a change in the viewpoint EP is further a change in the inclination angle of the mirror unit 104 for reflecting the view behind the vehicle 100. For example, such an action of the driver D of changing the inclination angle of the mirror unit 104 may imply that the viewpoint EP of the driver D is different from the viewpoint EP of a previous driver D who was driving the vehicle 100 before changing the inclination angle of the mirror unit 104. If there is a difference, the display location of the display image S may be unsuitable for the new viewpoint EP of the driver D. By the controller 30 therefore detecting such a change in the inclination angle of the mirror unit 104 as the information indicating a change in the viewpoint EP and causing the display unit 20 to exhibit the range display RD, with the range display RD, the driver D is allowed to easily determine whether the display location of the display image S is suitable for his or her viewpoint EP.

In the vehicle display device 1 of the embodiment, the information indicating a change in the viewpoint EP is further an input of the driver D of changing the display location of the display image S. By the controller 30 causing the display unit 20 to exhibit the range display RD when the driver D makes an input to the vehicle display device 1 of changing the display location of the display image S, with the range display RD, the driver D is allowed to easily adjust the display location of the display image S in comparison with a display device without the range display RD. The driver D can position the display location of the display image S at a suitable location by setting the range display RD entirely viewable.

Modification of Embodiment

Figure 5:
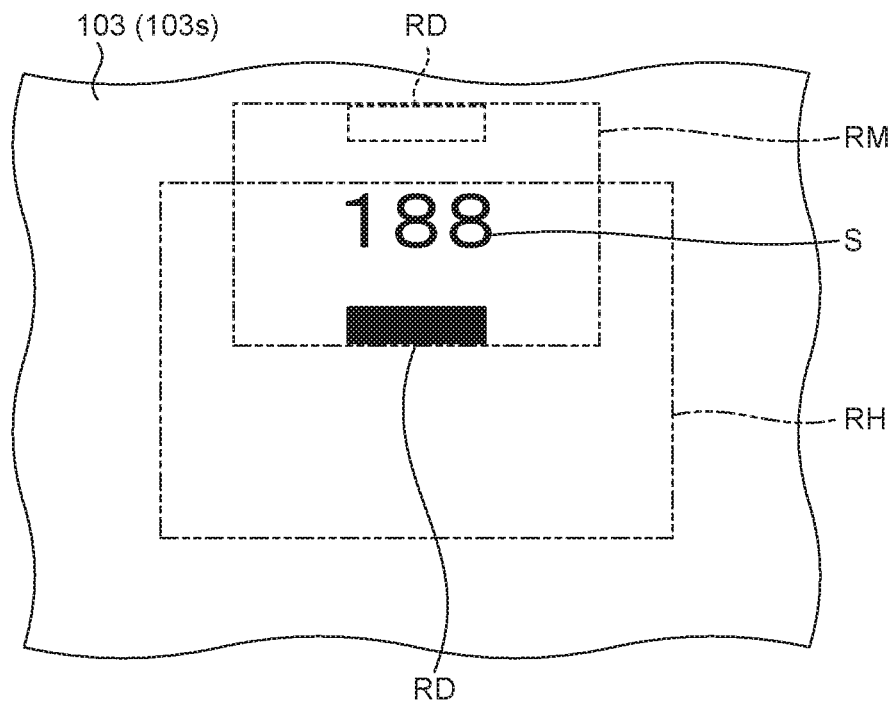
FIG. 5 is a plan view of a display image of a modification of the embodiment.
Figure 6:
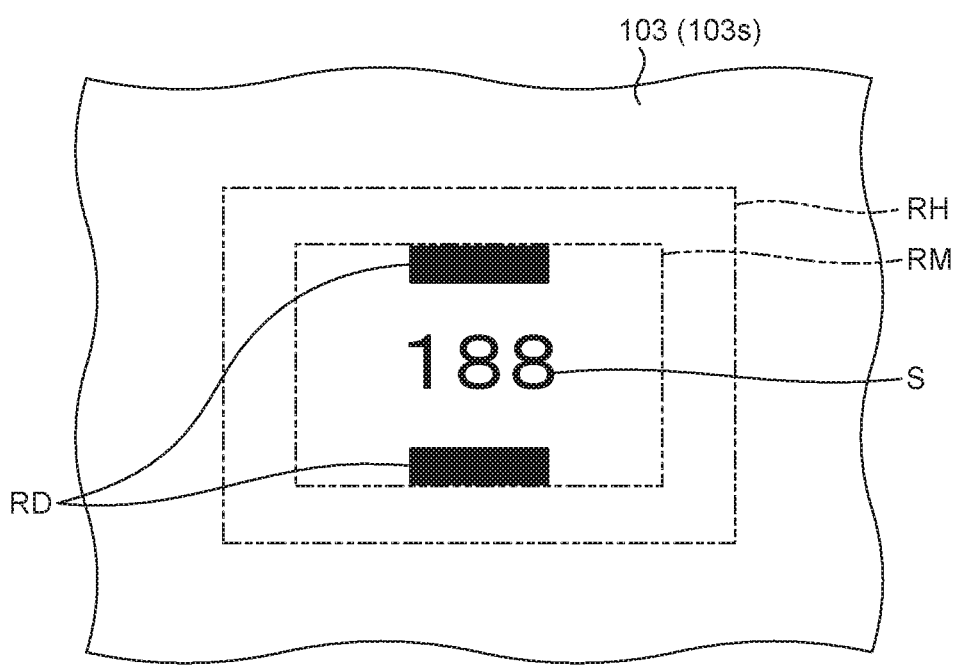
FIG. 6 is another plan view of the display image of the modification of the embodiment.

A modification of the embodiment will now be described with reference to FIGS. 5 and 6. In the modification of the embodiment, components that are functionally the same as components described in the above embodiment will be indicated by the same reference numerals, and description thereof will be omitted. FIG. 5 is a plan view of a display image of the modification of the embodiment. FIG. 6 is another plan view of the display image of the modification of the embodiment. FIG. 5 is a plan view corresponding to FIG. 3 of the above embodiment. FIG. 6 is a plan view corresponding to FIG. 4 of the above embodiment.

The vehicle display device 1 of the modification is different from the vehicle display device 1 of the embodiment in that the range display RD is exhibited at the top end and the bottom end of the maximum range RM for the display image S. Other structure is the same as that of the vehicle display device 1 of the embodiment. The range display RD consists of two lines. Of the two lines of the range display RD, one is arranged along the upper end of the maximum range RM, and the other line is arranged along the lower end of the maximum range RM.

For example, the viewpoint EP varies with variation in the sitting height of the driver D on board of the vehicle 100. The viewpoint EP of the driver D more frequently moves in the height direction of the vehicle 100 rather than in the width direction of the vehicle 100. The range display RD of the modification is therefore exhibited at the top end and the bottom end of the maximum range RM for the display image S. With the range display RD of the modification, the driver D is allowed to determine whether the display location of the display image S is suitable in the height direction.

As illustrated in FIG. 5, for example, when the viewpoint EP of the driver D is located higher than the range of viewpoints in which the display image S projected on the reflection unit 103 is suitably viewable, the display image S projected on the upper portion of the maximum range RM is not viewable. By the controller 30 causing the display unit 20 to exhibit the range display RD that defines the maximum range RM for the display image S, when the driver D makes an input to the vehicle display device 1 of changing the display location of the display image S, with the range display RD, the driver D is allowed to easily adjust the display location of the display image S to a suitable location with respect to the viewpoint EP, in comparison with a display device without the range display RD. By adjusting the display location of the display image S at a certain location where the range display RD is entirely viewable from the viewpoint EP, the driver D is allowed to make the display image S viewable throughout the maximum range RM as illustrated in FIG. 6.

The content described in the embodiment and the modification may be combined as appropriate.

The vehicle display device of the present embodiment is configured such that a controller causes a display unit to exhibit a range display that defines a maximum range for a display image upon detection of information indicating a change in the viewpoint of the driver on the vehicle. The vehicle display device of the present embodiment allows a driver to easily determine whether the display location of a display image is suitable.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle display device, comprising:
 a housing mounted on a vehicle and having an opening;
 a display unit disposed inside the housing and configured to project a display image toward a reflection unit arranged in front of a driver seat through the opening; and
 a controller configured to cause the display unit to exhibit a range display that defines a maximum range for the display image, upon detection of information indicating a change in a viewpoint of a driver on the vehicle, wherein
 the range display is a display in a form of frame along an edge of the maximum range.

2. The vehicle display device according to claim 1, wherein
 the information indicating a change in the viewpoint is a change in a seat position of the driver seat.

3. The vehicle display device according to claim 1, wherein
 the information indicating a change in the viewpoint is a change in an inclination angle of a mirror unit that reflects view behind the vehicle.

4. The vehicle display device according to claim 2, wherein
 the information indicating a change in the viewpoint is a change in an inclination angle of a mirror unit that reflects view behind the vehicle.

5. The vehicle display device according to claim 1, wherein
 the information indicating a change in the viewpoint is an input of the driver of changing a display location of the display image.

6. The vehicle display device according to claim 2, wherein
 the information indicating a change in the viewpoint is an input of the driver of changing a display location of the display image.

7. The vehicle display device according to claim 3, wherein
 the information indicating a change in the viewpoint is an input of the driver of changing a display location of the display image.

8. The vehicle display device according to claim 4, wherein
 the information indicating a change in the viewpoint is an input of the driver of changing a display location of the display image.

9. A vehicle display device, comprising:
 a housing mounted on a vehicle and having an opening;
 a display unit disposed inside the housing and configured to project a display image toward a reflection unit arranged in front of a driver seat through the opening; and
 a controller configured to cause the display unit to exhibit a range display that defines a maximum range for the display image, upon detection of information indicating a change in a viewpoint of a driver on the vehicle, wherein
 the information indicating a change in the viewpoint is a change in an inclination angle of a mirror unit that reflects view behind the vehicle.

10. The vehicle display device according to claim 9, wherein
 the information indicating a change in the viewpoint is an input of the driver of changing a display location of the display image.

11. The vehicle display device according to claim 10, wherein
 the information indicating a change in the viewpoint is a change in a seat position of the driver seat.

12. The vehicle display device according to claim 9, wherein
 the information indicating a change in the viewpoint is a change in a seat position of the driver seat.

13. A vehicle display device comprising:
 a housing mounted on a vehicle and having an opening;
 a display unit disposed inside the housing and configured to project a display image toward a reflection unit arranged in front of a driver seat through the opening; and
 a controller configured to cause the display unit to exhibit a range display that defines a maximum range for the display image, upon detection of information indicating a change in a viewpoint of a driver on the vehicle, wherein
 the information indicating a change in the viewpoint is an input of the driver of changing a display location of the display image.

14. The vehicle display device according to claim 13, wherein
 the information indicating a change in the viewpoint is a change in a seat position of the driver seat.

\* \* \* \* \*